(12) United States Patent
Ohlsson

(10) Patent No.: US 6,859,187 B2
(45) Date of Patent: Feb. 22, 2005

(54) HORN ANTENNA

(75) Inventor: Magnus Ohlsson, Norsholm (SE)

(73) Assignee: Saab Rosemount Tank Radar AB, Gothenburg (SE)

(*) Notice: Subject to any disclaimer, the term of this patent is extended or adjusted under 35 U.S.C. 154(b) by 32 days.

(21) Appl. No.: 10/388,763

(22) Filed: Mar. 17, 2003

(65) Prior Publication Data

US 2003/0179148 A1 Sep. 25, 2003

(30) Foreign Application Priority Data

Mar. 18, 2002 (SE) .............................................. 0200792

(51) Int. Cl.$^7$ .............................................. H01Q 13/00
(52) U.S. Cl. ..................................... 343/772; 343/786
(58) Field of Search ................................ 343/772, 786, 343/787, 784, 785; 333/21 A; H01Q 13/00

(56) References Cited

U.S. PATENT DOCUMENTS

| | | | |
|---|---|---|---|
| 3,611,392 A | 10/1971 | Knox .......................... | 343/781 |
| 4,665,403 A | 5/1987 | Edvardsson ................. | 342/124 |
| 4,788,553 A | 11/1988 | Phillips ...................... | 343/786 |
| 5,872,494 A | 2/1999 | Palan et al. ................. | 333/252 |
| 6,278,411 B1 | 8/2001 | Ohlsson et al. ............. | 343/772 |
| 6,363,909 B1 | 4/2002 | Tomoda ....................... | 123/295 |
| 6,661,389 B2 * | 12/2003 | Griessbaum et al. ........ | 343/786 |
| 2003/0151560 A1 * | 8/2003 | Kienzle et al. .............. | 343/786 |
| 2003/0167839 A1 * | 9/2003 | Burger et al. ............. | 73/290 V |

FOREIGN PATENT DOCUMENTS

| | | |
|---|---|---|
| DE | 9412243.1 | 11/1994 |
| DE | 10040943 | 3/2002 |
| DE | 10057441 | 5/2002 |
| EP | 0871241 | 10/1998 |
| EP | 0943902 | 9/1999 |
| JP | 54083740 | 7/1979 |
| JP | 2002009542 A * | 1/2002 |
| JP | 2002009542 | 1/2002 |
| WO | 02/50954 | 6/2002 |

* cited by examiner

*Primary Examiner*—Don Wong
*Assistant Examiner*—Trinh Vo Dinh
(74) *Attorney, Agent, or Firm*—Westman, Champlin & Kelly, P.A.

(57) ABSTRACT

The present invention relate to a horn antenna at a radar level gauge for determination of a level of a surface of a medium stored in a tank and a method of making a horn antenna which is mechanically constituted such that the horn antenna will withstand the environment of the tank interior. The antenna comprises a first conductive housing (7) having a wave guide port (8), which is connectable to a wave guide, a first aperture (10), which is separated from the wave guide port (8) and a fist divergent section between the wave guide port (8) and the first aperture (10). A dielectric body (11) is arranged inside and essentially filling the first conductive housing (7), which body (11) displays a free end (12) in the area of the first aperture (10). The horn antenna is characterized in that around the first aperture (10) is arranged a locking device (13), which is arranged to fix the dielectric body (11) in the first housing (7) and that in the area of the locking device (13) is arranged at least one flexible sealing element (16) between the dielectric body (11) and the first cover (7).

20 Claims, 4 Drawing Sheets

HORN ANTENNA

TECHNICAL FIELD OF THE INVENTION

The present invention relates to a horn antenna for use with a level gauge utilizing a radar for determination of a surface level of a medium stored in a tank, whereby the invention discloses both a device and a method for achieving a horn antenna which is mechanically constituted such that the horn antenna will withstand the environment inside the tank in the form of pressure variations and contaminating substances in order to prevent contamination of the antenna and leakage to the outside of the tank.

RELATED ART

It is previously known to gauge a surface level of a medium stored in a tank using radar level gauges. An example of such a device is given by the patent document U.S. Pat. No. 4,665,403. At a device of the type disclosed by the referenced document, a pipe, which communicates with the medium of the tank, is utilized as a wave guide for the microwaves which are transmitted from a radar unit and which are received by the same radar unit after being reflected by the surface of the medium in the pipe.

Horn antennas are used extensively in connection with radar based level gauging. In the design of horn antennas, one tries to obtain as high an antenna gain as possible at the same time as one desires a low level of side lobes. Furthermore, the antenna must withstand strain brought on by the tank environment, such as occurrence of high or low pressure, high or low temperatures, condensation and aggressive substances. These types of strains may occur individually or in combination with each other.

In order to withstand the mentioned strains it has been common in the past, when deemed appropriate, to provide air filled horn antennas with a so called process window. This is constituted by a cover or lens like object, realized in a plastic material, which is affixed to the surface that forms the widest opening of the horn towards the surrounding atmosphere. The performance of the antenna (antenna gain and the level of the side lobes) is trimmed through adaptation between the length of the horn and the opening diameter thereof. Still a certain phase error of the microwaves transmitted from or received by the antenna at the opening remains which worsens the antenna gain and the level of the side lobes.

A horn of an antenna lacking a process window has a seal against the tank atmosphere in the shape of a dielectric rod which is pointed at the end facing the tank and which is placed at the neck of the horn, i.e. at the narrowest section of the horn. See patent document U.S. Pat. No. 6,278,411. The ability of the antenna to withstand pressure, having such an arrangement, is good. However, in combination with impurities and condensation difficulties with dampening and reflection of microwaves remain, as the antenna is covered with a layer of impurities or condensation. This is further accentuated when using higher frequencies than those previously normally used for radar based level gauging, as the dimensions of the horn itself are reduced. Through the smaller dimensions of the antenna horn the difficulties with condensation and soiling are increased. Condensation in the form of e.g. water, in this case leads to increased dampening.

A horn having a process window is less sensitive to condensation and soiling but it is not able to resist pressure as well as the horn lacking a process window. This is due to the fact that the thickness of the process window is kept within as few quarter wavelengths as possible. Using such a high microwave frequency as 24 GHz a process window made from a PTFE-plastic material will have a thickness of 4 mm. A plastic layer of that thickness will be fairly sensitive for the effects of pressure. The materials used for process windows are preferably different kinds of fluoroplastic materials, as these exhibit good resistance to chemicals. On the other hand the mechanical properties are not the best.

In microwave based gauging of a level of a surface of a medium in a tank, the antenna and its related feeding arrangement generally constitute a feed-through in a wall (top, side, or bottom) of the tank. The portion of the feed-through that is located outside the tank may or may not be in direct communication with the atmosphere outside the tank. For instance, in installation and maintenance, the feed-through may be in direct communication with the outside atmosphere. Further, it may be connected to a compartment that houses electronics, which should be kept separated from the atmosphere in the tank. The atmosphere in the tank may contain substances that could cause corrosion, explosion, health risks, and environmental damage. Thus, depending on the specific technical application, the risk of leakage between the inside and the outside of the tank may be an important factor to take into account when designing the antenna and related parts.

The patent application DE 100 40 943 A1 relates to a horn antenna. That document discloses a horn antenna wherein a dielectric filling material is used for filling essentially all of the interior of the horn antenna in order to avoid deposits of condensed substances or dirt in the particularly critical area of the antenna. Thereby, there is essentially no room for deposits in the interior of the antenna. This seems to provide a solution to the problem of preventing disturbances of the measurement signal in the antenna. However, the document does not address the problem of preventing leakage from the tank through the antenna to the outside of the tank. The document further discloses two different wave guide feeding arrangements for the horn antenna. In one arrangement, the wave guide is completely filled by a dielectric. In another arrangement, the wave guide is partly air filled. In conclusion, there is no description in relation to any of these arrangements of whether or not the wave guide is provided sealing means to prevent the type of leakage mentioned above.

DESCRIPTION OF THE INVENTION

According to an aspect of the invention is presented a horn antenna at a radar level gauge for determination of a surface level of a medium stored in a tank. The antenna is intended for transmission and reception of microwaves using a microwave unit arranged at the roof of the tank. The antenna comprises a first conductive housing with a wave guide port which is connectable to a wave guide, a first aperture which is separate from the wave guide port and a first divergent section between said wave guide port and the first aperture. A dielectric body is arranged within and essentially filling the first conductive housing, which body has a free end in the area of the first aperture. The horn antenna is characterized in that a locking device is arranged around the first aperture, which locking device is arranged to affix the dielectric body inside the first housing and that in the area of the locking device is arranged at least one flexible sealing element between the dielectric body and the first housing. The invention thereby provides a device for efficiently separating the atmospheres inside and outside the tank while maintaining a mechanically pressure resistant antenna design and an efficient microwave performance.

In accordance with a second aspect of the invention is presented a method for achieving a horn antenna which is mechanically constituted such that the horn antenna will withstand the environment present inside the tank in the form of pressure variations and contaminating substances. The method comprises making a first divergent conductive housing with a wave guide port which is attachable to a wave guide, a first aperture which is separate from the wave guide port and a divergent section between the wave guide port and the first aperture. A dielectric body is affixed inside and essentially filling the first housing such that a first end of the dielectric body appears in the area of the first aperture. A locking device is arranged around the first aperture, whereby the dielectric body is fixed in the first housing. A flexible sealing element is arranged between the dielectric body and the first housing in the area of the locking device. The invention thereby provides one way of efficiently separating the atmospheres inside and outside the tank while maintaining a mechanically pressure resistant antenna design and an efficient microwave performance.

DESCRIPTION OF EMBODIMENTS

An example of an embodiment will be given with reference to the attached drawings.

Figure 1:
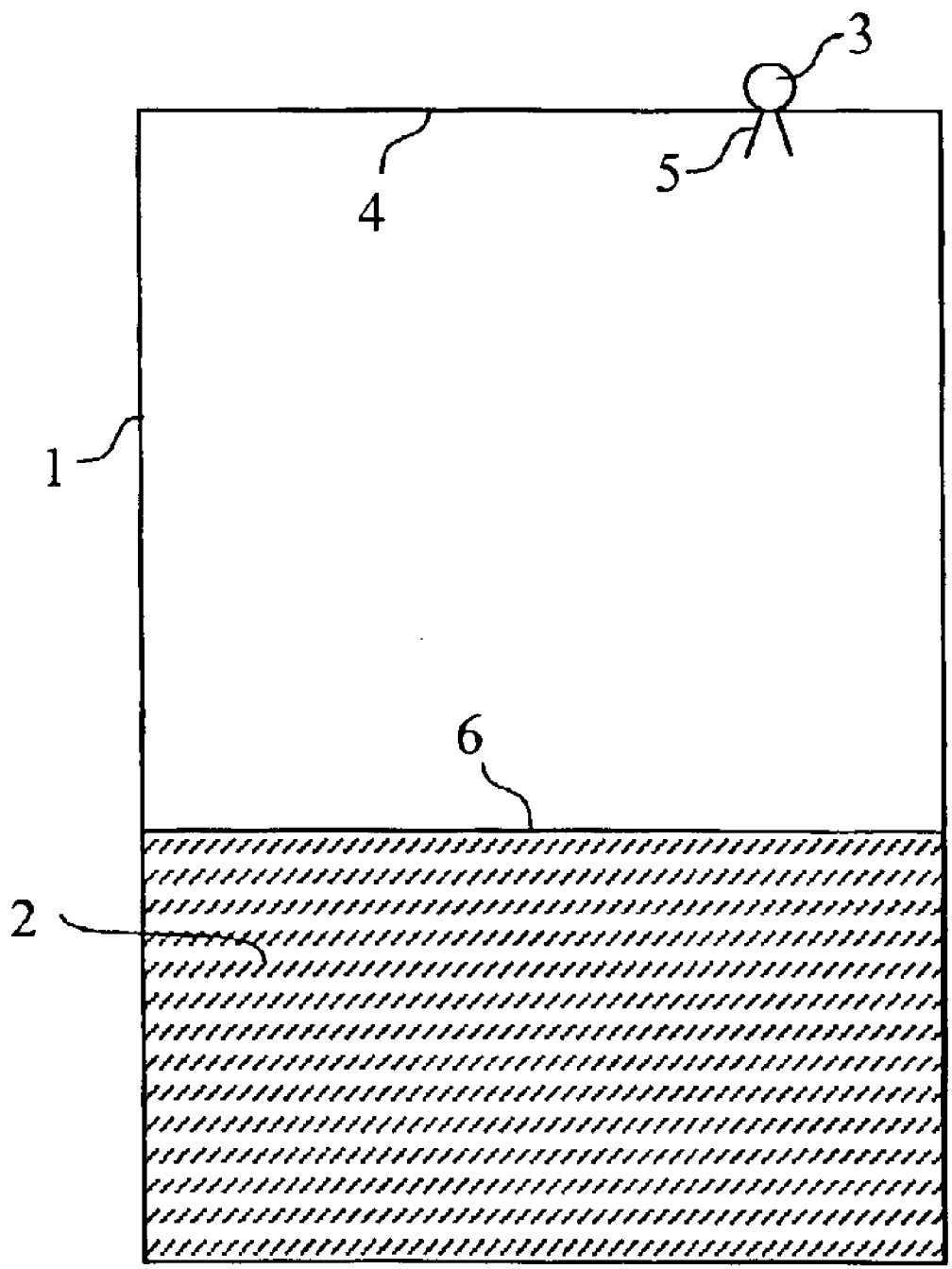
FIG. 1 Shows, with an example, the principle of a radar level gauge.

The principle of a radar level gauge is shown in FIG. 1. A tank 1 is used for storing a medium 2. The medium can be a fluid, such as oil, refined products and gas in the liquid state, or a particulate material, i.e. a pulverized solid state substance. A radar 3 is arranged at the roof 4 of the tank 1, wherefrom a microwave beam is transmitted from the radar via an antenna 5 at the inside of the tank. The emitted beam is reflected from the surface 6 of the medium and received by the antenna 5. Through a comparison and evaluation of the time delay between the transmitted signal and the reflected signal, in an evaluation and control unit, a determination of the surface 6 level of the medium can be made using known procedures.

Figure 2:
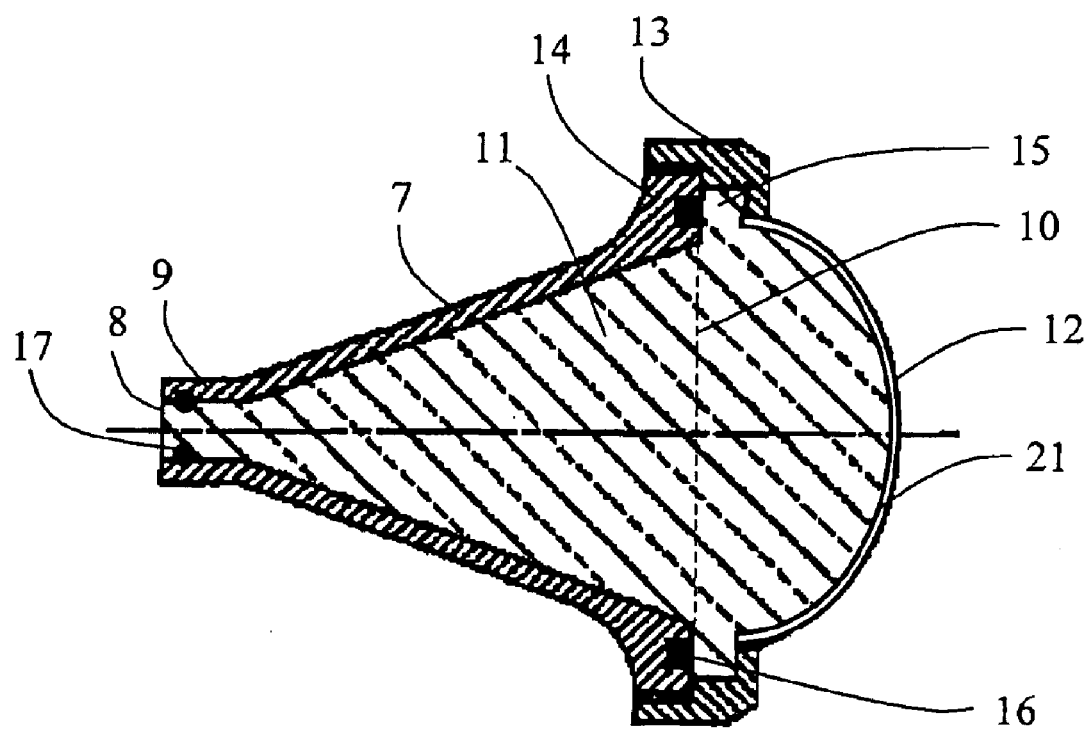
FIG. 2 Shows a section through a first embodiment of a horn antenna in accordance with the present invention.

FIG. 2 shows a first embodiment of the horn antenna in accordance with the present invention. The antenna displays a first conductive housing 7, preferably of metal. The housing 7 has a wave guide port 8 which is attachable to a wave guide. In the area of the wave guide port 8 the housing 7 may be equipped with a section 9 of constant cross-section which constitutes an extension of the wave guide. The antenna housing 7 displays a first aperture 10, which in the embodiment according to FIG. 2 is concentric with the wave guide port 8 and positioned axially spaced from the wave guide port 8 and a first divergent section between the wave guide port and the first aperture. A dielectric body 11 is arranged within and essentially filling the first conductive housing 7 and exhibits a free end 12 in the area of the first aperture 10. A locking device 13 is arranged around the first aperture, which locking device is arranged to fix the dielectric body 11 in the first housing 7. In the area of the locking device 13 is arranged a flexible sealing element 16 between the dielectric body and the first housing 7. For redundancy, are preferably used two sealing elements (not shown). The flexible sealing element 16 is suitably constituted of one or several O-rings. The locking can, as is shown in FIG. 2, be achieved through the first housing 7 exhibiting a radially outwards directed flange 14 around the first aperture 10 against which a complementary designed flange 15, at the free end 12 of the dielectric body is pressed by a ring 13, intended as locking device, which ring e.g. can be attached to the flange 14 of the housing through complementary designed threads at the flange 14 and the ring 13 respectively or other suitable joining method. The flexible sealing element 16 in this embodiment is suitably placed between the flange 14 of the housing and the flange 15 of the dielectric body.

The sealing element 16, between the dielectric body 11 and the first housing 7 according to FIG. 2, is arranged to receive pressure between the dielectric body 11 and the first housing 7, such that it is arranged to be pressurized further upon displacement of the dielectric body 11 relative to the first housing 7 caused by the pressure present in the tank. Further, the sealing element 15 is preferably made of a material, e.g. a fluoroplastic material, which is resistant to chemical effects from the kind of mediums which are supposed to be stored in the tank where the antenna is supposed to be used.

In order to further reduce the possibility of accumulation of inappropriate materials between the dielectric body 11 and the first housing 7, a further sealing element 17 may be arranged between the dielectric body 11 and the housing 7 in the area of the wave guide port 8. Also this sealing element 17 preferably consist of one or several O-rings.

In order to further enhance the gain of the antenna and the level of the side lobes, the free end 12 of the dielectric body is shaped as a lens, e.g. an essentially concave lens, as is shown in FIG. 2. In this way a possibly occurring phase error of the microwaves can be reduced, taking advantage of the propagation speed of the micro waves in the lens material, and transmission from the antenna of an essentially plane wave front can be achieved.

The dielectric body 11 is suitably made from two different materials with a surface interface 21 to each other, where the outermost layer of the free end of the body preferably is made from a fluoroplastic material having good resistance to chemicals while the rest of the body is made from a plastic material having, compared to the fluoroplastic material, better thermal properties but is less resistant to chemicals, such as a PPS-plastic. The fluoroplastic material layer suitably has a thickness corresponding to a quarter of the wavelength which the antenna is intended for, whereby the reflection from the antenna opening is reduced.

Figure 3:
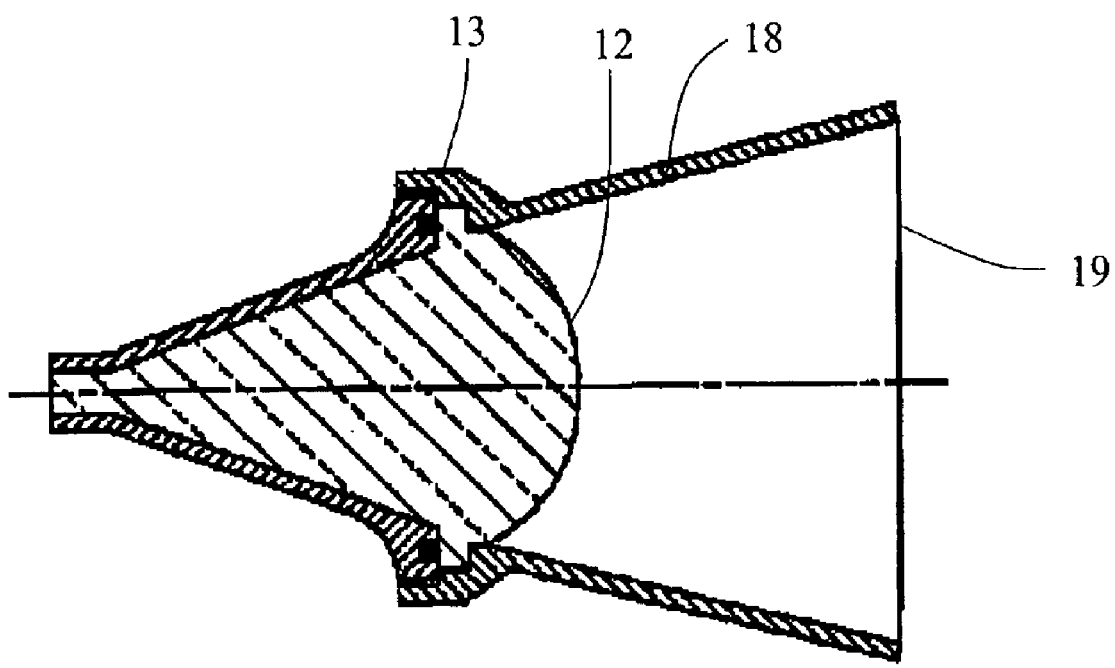
FIG. 3 Shows a section through a second embodiment of a horn antenna in accordance with the present invention.

In certain cases, e.g. when increased antenna gain is desired or when the mounting flange of the tank comprises a sleeve coupling extending downwards inside the tank, it might be desirable to extend the housing outside of the free end 13 of the dielectric body. An embodiment of an antenna having an extension for increased antenna gain is shown in FIG. 3. An additional embodiment, for use when the tank connection comprises a sleeve coupling as above, is shown in FIG. 4.

The antenna shown in FIG. 3 is essentially constituted as described with reference to FIG. 2 but with the addition that it, for increased antenna gain, displays a second divergent conductive housing 18. The second housing 18, in the embodiment according to FIG. 3, is concentric with the first housing 7 and extends the first housing 7 axially towards a second aperture 19, which is situated axially outside of the free end 12 of the dielectric body.

Figure 4:
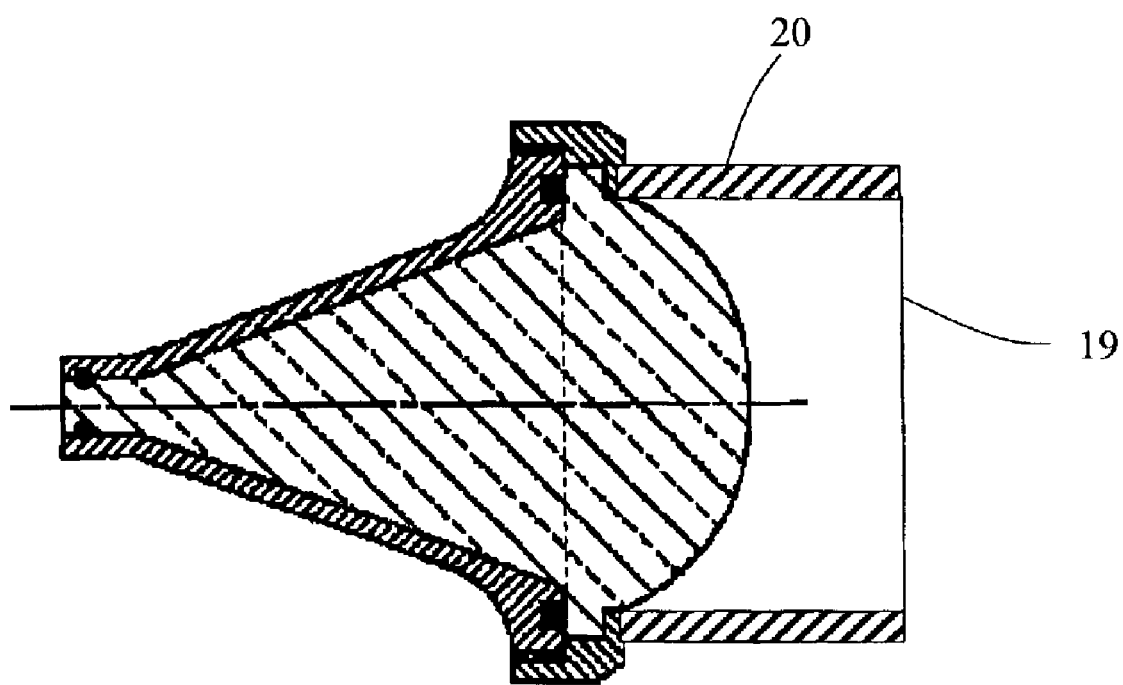
FIG. 4 Shows a section through a third embodiment of a horn antenna in accordance with the present invention.

Alternatively, as is shown in FIG. 4, when a sleeve coupling as above is present, the extension 20 can be realized cylindrical with a constant cross-section, with the purpose of extending the antenna past the extension of the coupling sleeve, such that interference from the coupling sleeve is avoided.

A horn antenna being mechanically constituted such that the horn antenna can withstand the environment of the tank interior in the form of pressure variations and contaminating substances can be achieved through a method as follows.

A first divergent conductive housing 7 is made and provided with a wave guide port 8, which is made attachable to a wave guide. The housing 7 is further provided with a first aperture 10, which is concentric with the wave guide port 8 and situated axially spaced from the wave guide port 8. The housing 7 is brought to connect the wave guide port 8 and the first aperture 10 through a divergent section being arranged there between. A dielectric body 11 is arranged inside of and essentially filling the first housing 7, such that a free end 12 of the body 11 appears in the area of the first aperture 10. Around the first aperture 10 is arranged a locking device 13, through which the dielectric body 11 is fixed in the first housing 7. Further is arranged, in the area of the locking device 13, at least one flexible sealing element 16 between the dielectric body 11 and the first housing 7.

An additional sealing element 17 is suitably arranged between the dielectric body 11 and the first housing 7 in the area of the wave guide port 8. This sealing element 17 as well as the sealing element 16 in the area of the locking device 13, are suitably achieved through arranging one or several O-rings between the dielectric body 11 and the first housing 7.

The free end 12 of the dielectric body is suitably shaped as a lens for correction of a possible phase error of the microwaves and achievement of an essentially plane wave front. Further, the dielectric body 11 is suitably made from two different materials with a surface interface to each other, where the outermost layer of the free end of the dielectric body is made of a fluoroplastic material while the remainder of the dielectric body is made from a plastic material having better thermal properties, such as a PPS-plastic. The fluoroplastic material layer is hereby suitably given a thickness corresponding to a quarter of the wavelength for which the antenna is intended.

Should one wish to extend the housing outside the free end 12 of the dielectric body, a second conductive housing 18, 20 is suitably attached around the first aperture 10, concentrically with the first housing 7. Hereby is achieved an extension of the first housing 7 axially towards a second aperture 19, such that the second aperture 19 will be situated axially outside the free end 12 of the dielectric body.

Should one only desire to extend the antenna, in order to e.g. avoid interference from structures at the attachment of the antenna to the roof of the tank, the second conductive housing 20 is suitably made having a section of essentially constant cross-section between the first aperture 10 and the second aperture 19.

What is claimed is:

1. A horn antenna intended for transmission and reception of microwaves when gauging a level of a surface of a medium stored in a tank by means of a microwave unit arranged at the roof of the tank, where the antenna comprises:
   a first conductive housing (7) having a wave guide port (8), which is connectable to a wave guide,
   a first aperture (10), which is separated from the wave guide port (8) and
   a first divergent section between the wave guide port (8) and the first aperture (10);
   a dielectric body (11) is, for maintaining a mechanically pressure resistant antenna design, arranged inside and essentially filling the first conductive housing (7), which body (11) displays a free end (12) in the area of the first aperture (10),
   characterized in that
   around the first aperture (10) is arranged a locking device (13),
   the locking device (13) is arranged to fix the dielectric body (11) in the first housing (7), and
   in the area of the locking device (13) is, for efficiently separating atmospheres inside and outside the tank, arranged at least one flexible pressure sealing element (16) between the dielectric body (11) and the first housing (7).

2. The horn antenna of claim 1, characterized in that, the sealing element (16) is arranged to absorb pressure between the dielectric body (11) and the first housing (7), such that it is arranged to be pressurized in case of displacement of the dielectric body (11) relative to the first housing (7) caused by a pressure inside the tank.

3. The horn antenna of claim 1, characterized in that, in the area of the wave guide port (8) there is arranged at least one additional sealing element (17) between the dielectric body (11) and the first housing (7).

4. The horn antenna of claim 1, characterized in that, at least one of the sealing elements (16, 17) includes at least one O-ring.

5. The horn antenna of claim 1, characterized in that, the free end (12) of the dielectric body is shaped as a lens for correction of a possible phase error of the microwaves, for obtaining an essentially plane wave front.

6. The horn antenna of claim 1, characterized in that, the dielectric body (11) is composed of two different materials having a surface interface to one another.

7. The horn antenna of claim 6, characterized in that, an outermost layer of the free end of the dielectric body is made from a fluoroplastic material while the remainder of the dielectric body (11) is made from a plastic material having better thermal properties, such as a PPS-plastic.

8. The horn antenna of claim 7, characterized in that, a thickness of the fluoroplastic material corresponds to a quarter of the wavelength for which the antenna is intended.

9. The horn antenna of claim 1, characterized in that, around the first aperture (10) there is arranged a second conductive housing (18, 20), which extends the first housing (7) towards a second aperture (19).

10. The horn antenna of claim 9, characterized in that, the second conductive housing (18) includes a second divergent portion between the first aperture (10) and the second aperture (19).

11. The horn antenna of claim 9, characterized in that, the second conductive housing (20) includes a portion having an essentially constant cross-section between the first aperture (10) and the second aperture (19).

12. Method for making a horn antenna intended for transmission and reception of microwaves when gauging a level of a surface of a medium stored in a tank by means of a microwave unit arranged at the roof of the tank, which method comprises:
   making a first divergent conductive housing (7) having a wave guide port (8), which is connectable to a wave guide, a first aperture (10) which is separated from the wave guide port (8) and a divergent section between the wave guide port a (8) and the first aperture (10);

for maintaining a mechanically pressure resistant antenna design, fixing a dielectric body (11) inside and essentially filling the first housing (7) such that a free end (12) of the dielectric body (11) appears in the area of the 30 first aperture (10), arranging a locking device (13) around the first aperture (10), whereby the dielectric body (11) is fixed in the first cover (7) and arranging, in the area of the locking device (13), a flexible pressure sealing (16) between the dielectric body (11) and the first housing (7), for efficiently separating atmospheres inside and outside the tank.

13. The method of claim 12, further comprising: arranging, in the area of the wave guide port (8), an additional sealing element (17) between the dielectric body (11) and the first housing (7).

14. The method of claim 12, further comprising: using as sealing element (16, 17) at least one O-ring.

15. The method of claim 12, further comprising: shaping the free end (12) of the dielectric body as a lens for correction of a possible phase error of the microwaves for achieving an essentially plane wave front.

16. The method of claim 12, further comprising: making the dielectric body (11) from two materials where an outermost layer of the free end of the dielectric body is made from a fluoroplastic material, while the remainder of the dielectric body (11) is made from a plastic material having better thermal properties, such as a PPS-plastic.

17. The method of claim 16, further comprising: giving the fluoroplastic material layer a thickness corresponding to a quarter of the wavelength the antenna is intended for.

18. The method of claim 12, further comprising: arranging around the first aperture (10) a second conductive housing (18, 20), which extends the first housing (7) towards a second aperture (19).

19. The method of claim 18, further comprising: affixing a second conductive housing (18), which includes a second divergent section between the first aperture (10) and the second aperture (19).

20. The method of claim 18, further comprising: affixing a second conductive housing (20), which includes a section having an essentially constant cross-section between the first aperture (10) and the second aperture (19).

* * * * *